United States Patent
Kim et al.

(10) Patent No.: US 10,286,764 B2
(45) Date of Patent: May 14, 2019

(54) REMOVABLE ROOF PANEL FOR A VEHICLE

(71) Applicant: GM Global Technology Operations LLC, Detroit, MI (US)

(72) Inventors: Wonhee M. Kim, Royal Oak, MI (US); Paul W. Alexander, Ypsilanti, MI (US); Julien P. Mourou, Bloomfield Hills, MI (US); James H. Shoemaker, White Lake, MI (US); Besy J. Philip, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/728,059

(22) Filed: Oct. 9, 2017

(65) Prior Publication Data
US 2019/0105972 A1    Apr. 11, 2019

(51) Int. Cl.
*B60J 7/11*  (2006.01)
*B60J 7/12*  (2006.01)

(52) U.S. Cl.
CPC .............. *B60J 7/11* (2013.01); *B60J 7/1204* (2013.01); *B60J 7/1256* (2013.01); *B60J 2007/1208* (2013.01)

(58) Field of Classification Search
CPC . B60J 7/0092; B60J 7/1256; B60J 7/11; B60J 7/12; B60J 7/1204
USPC .................................................. 296/218, 219
See application file for complete search history.

(56) References Cited

U.S. PATENT DOCUMENTS

| | | | | |
|---|---|---|---|---|
| 3,050,334 | A * | 8/1962 | Geiger | B60J 7/1256 296/107.07 |
| 5,009,465 | A * | 4/1991 | Induni | B60J 7/08 160/327 |
| 5,267,774 | A * | 12/1993 | Garner | B60J 7/1226 296/218 |
| 6,520,572 | B1 * | 2/2003 | Niederman | B60J 7/06 180/281 |
| 7,770,958 | B2 * | 8/2010 | Bunsmann | B60J 7/1291 296/121 |
| 2006/0186700 | A1 * | 8/2006 | Browne | B60J 7/04 296/187.01 |
| 2015/0107233 | A1 * | 4/2015 | Ou | F15B 15/10 60/327 |

FOREIGN PATENT DOCUMENTS

DE          3923725      *   1/1991

* cited by examiner

*Primary Examiner* — Dennis H Pedder
(74) *Attorney, Agent, or Firm* — Quinn IP Law (57) ABSTRACT

A roof panel includes a first member and a second member. A panel is attached to and interconnects the first member and the second member. The panel is configurable between a deployed configuration for attachment to a vehicle, and a stowed configuration for storage. The panel has a planar form when in the deployed configuration, and a rolled up form when in the stowed configuration. The panel may include an adjustable stiffness panel, such as a layer jamming panel, controllable in response to a control signal to exhibit a first stiffness when in the deployed configuration or the stowed configuration, or a second stiffness for reforming the panel between the deployed configuration and the stowed configuration.

9 Claims, 5 Drawing Sheets

REMOVABLE ROOF PANEL FOR A VEHICLE

The disclosure generally relates to a removable roof panel for a vehicle.

Some vehicles are equipped with removable roof panels. The roof panels attach to structural members of the vehicle to provide a roof for a passenger compartment, but may be removed if desired. When removed, the roof panels must be stowed, such as in a trunk space of the vehicle.

The following applications, which are assigned to the assignee of this application, may be considered for a further understanding of this disclosure: U.S. patent application Ser. No. 15/727,757, filed on Oct. 9, 2017, and titled "Conformable And Reconfigurable Occupant Support Structure"; and U.S. patent application Ser. No. 15/728,034, filed on Oct. 9, 2017, and titled "Stretchable Adjustable-Stiffness Assemblies".

SUMMARY

A vehicle is provided. The vehicle includes a body having a first structural member and a second structural member. A roof panel is removably attached to the body. The roof panel includes a first member and a second member. The first member is releasably secured to the first structural member, and the second member is releasably secured to the second structural member. A panel is attached to and interconnects the first member and the second member. The roof panel is configurable between a deployed configuration for attachment to the body, and a stowed configuration for storage. The roof panel has a generally planar form when configured in the deployed configuration, and has a generally rolled form when configured in the stowed configuration.

In one embodiment of the vehicle, the panel is an adjustable stiffness panel that is controllable in response to a control signal. The control signal controls the stiffness of the adjustable stiffness panel to exhibit one of a first stiffness or a second stiffness. The first stiffness may include a higher, more rigid stiffness, and the second stiffness may include a lower, more flexible stiffness. The adjustable stiffness panel may include one of, or a combination of, a layer jamming panel, an inflatable panel, a mechanically locking panel, or electro-magnetic panel.

In one embodiment of the vehicle, the adjustable stiffness panel may be controlled to exhibit the first stiffness when the roof panel is configured in the deployed configuration. The adjustable stiffness panel may be controlled to exhibit the second stiffness when re-configuring the adjustable stiffness panel between the deployed configuration and the stowed configuration. The adjustable stiffness panel may be controlled to exhibit the first stiffness when configured in the stowed configuration to maintain the generally rolled form of the stowed configuration.

In one embodiment of the vehicle, one of the first structural member and the second structural member includes a control interface that is operable to communicate the control signal to the adjustable stiffness panel. The control signal may include one of, or a combination of, a negative air pressure, a positive air pressure, or an electric current. The control interface provides the respective control signal to the adjustable stiffness panel.

In one embodiment of the vehicle, one of the first member and the second member include an actuator that is operable to generate the control signal. The actuator may include one of a vacuum pump or an air pressure pump. In one embodiment, the actuator includes a mechanical actuator that is operable to generate the control signal. The mechanical actuator may include a manually actuated pump that is operable to generate a negative air pressure or a positive air pressure in the adjustable stiffness panel.

In one embodiment of the vehicle, the roof panel includes a first support and a second support. When the roof panel is disposed in the deployed configuration, the first support extends perpendicular to and interconnects the first member and the second member along a first edge of the panel. When the roof panel is disposed in the stowed configuration, the first support is disposed parallel to the first member and the second member. When the roof panel is disposed in the deployed configuration, the second support extends perpendicular to and interconnects the first member and the second member along a second edge of the panel. When the roof panel is disposed in the stowed configuration, the second support is disposed parallel to the first member and the second member. The roof panel further includes a spar. When the roof panel is disposed in the deployed configuration, the spar is attached to and interconnects the first support and the second support. When the roof panel is disposed in the stowed configuration, the spar is detached from the first support and the second support.

A roof panel for a vehicle is also provided. The roof panel includes a first member and a second member. The first member is configured for releasable attachment to a forward roof member of the vehicle. The second member is configured for releasable attachment to a rearward roof member of the vehicle. An adjustable stiffness panel is attached to and interconnects the first member and the second member. The adjustable stiffness panel includes a layer jamming panel that is controllable in response to a vacuum control signal to exhibit one of a first stiffness or a second stiffness. The adjustable stiffness panel is configurable between a deployed configuration and a stowed configuration. When the adjustable stiffness panel is configured in the deployed configuration, the adjustable stiffness panel has a generally planar form and is controlled to exhibit the first stiffness. When the adjustable stiffness panel is configured in the stowed configuration, the adjustable stiffness panel has a generally rolled form, and is controlled to exhibit the first stiffness to maintain the generally rolled form of the stowed configuration. The adjustable stiffness panel may be controlled to exhibit the second stiffness when the adjustable stiffness panel is being re-configured between the deployed configuration and the stowed configuration.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
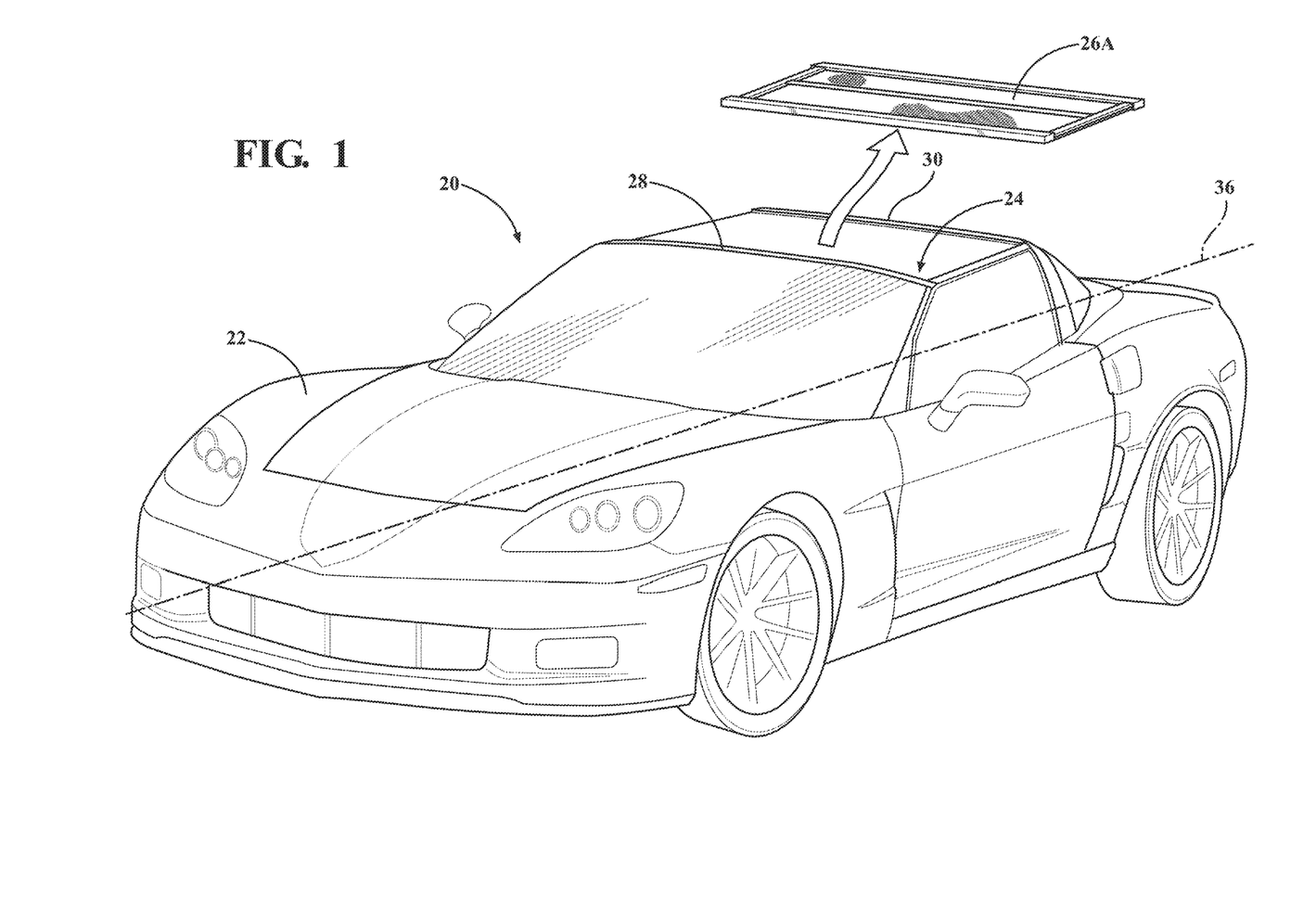
FIG. 1 is a schematic partially exploded perspective view of a vehicle.

Referring to the FIGS., wherein like numerals indicate like parts throughout the several views, a vehicle is generally shown at 20 in FIG. 1. Referring to FIG. 1, the vehicle 20 may include any type of moveable platform having a body 22 that defines an interior passenger compartment 24. For example, the vehicle 20 may include a car, a truck, a van, etc. The vehicle 20 includes a removable roof panel 26A, 26B, 26C, 26D that is selectively attached to the body 22 to provide a cover or partially enclose the passenger compartment 24.

The body 22 includes a first structural member 28 and a second structural member 30. The first structural member 28 may include, but is not limited to, a forward roof member, such as a windshield frame or the like. The second structural member 30 may include, but is not limited to, a rearward roof member, such as a roof cross member or other similar structure. It should be appreciated that the first structural member 28 and the second structural member 30 may be defined as and include other components of the body 22 that are capable of supporting the roof panel 26A, 26B, 26C, 26D relative to the body 22.

The roof panel 26A, 26B, 26C, 26D includes a first member 32 and a second member 34. Depending on how the roof panel 26A, 26B, 26C, 26D is oriented, the first member 32 and the second member 34 may be considered side frame rails or fore and aft frame rails of the roof panel 26A, 26B, 26C, 26D respectively. The first member 32 is releasably secured or attached to the first structural member 28 and/or the second structural member 30. The second member 34 is releasably secured or attached to the first structural member 28 and/or the second structural member 30. For example, if the first member 32 and the second member 34 are configured as side rails of the roof panel 26A, 26B, 26C, 26D, which extend axially along a longitudinal axis 36 of the vehicle 20, then each of the first member 32 and the second member 34 is attached to both the first structural member 28 and the second structural member 30. In other embodiments, if the first member 32 and the second member 34 are configured as fore and aft frame rails respectively, in which they extend laterally across a width of the vehicle 20 and perpendicular to the longitudinal axis 36 of the vehicle 20, then one of the first member 32 and the second member 34 is attached to the first structural member 28, and the other of the first member 32 and the second member 34 is attached to the second structural member 30.

The first member 32 and the second member 34 may be attached to the first structural member 28 and/or the second structural member 30 in any suitable manner. For example, each end of the first member 32 and the second member 34 may include a latch member or other connection component that engages a corresponding latch member or connection component on the first structural member 28 or the second structural member 30. The specific manner in which the first member 32 and the second member 34 are attached or connected to the first structural member 28 and the second structural member 30 is not pertinent to the teachings of this disclosure, and is therefore not described in detail herein.

The roof panel 26A, 26B, 26C, 26D includes a panel 38 which is attached to and interconnects the first member 32 and the second member 34. The roof panel 26A, 26B, 26C, 26D is configurable between a deployed configuration for attachment to the body 22, and a stowed configuration for storage when detached from the body 22. When the roof panel 26A, 26B, 26C, 26D is configured in the deployed configuration, the roof panel 26A, 26B, 26C, 26D has a generally planar form or shape to cover the passenger compartment 24. When the roof panel 26A, 26B, 26C, 26D is configured in the stowed configuration, the roof panel 26A, 26B, 26C, 26D may have a generally rolled or cylindrical form or shape to provide a more compact and convenient shape for storage.

Figure 2:
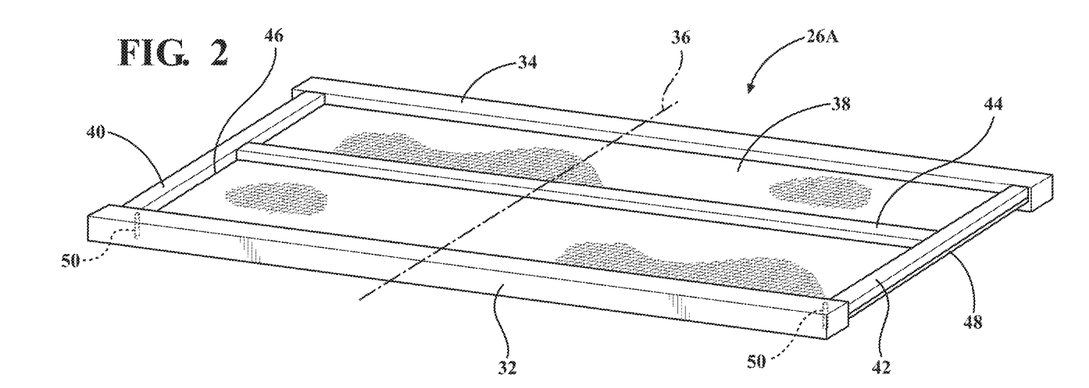
FIG. 2 is a schematic perspective view of a first embodiment of a roof panel in a deployed configuration.
Figure 3:
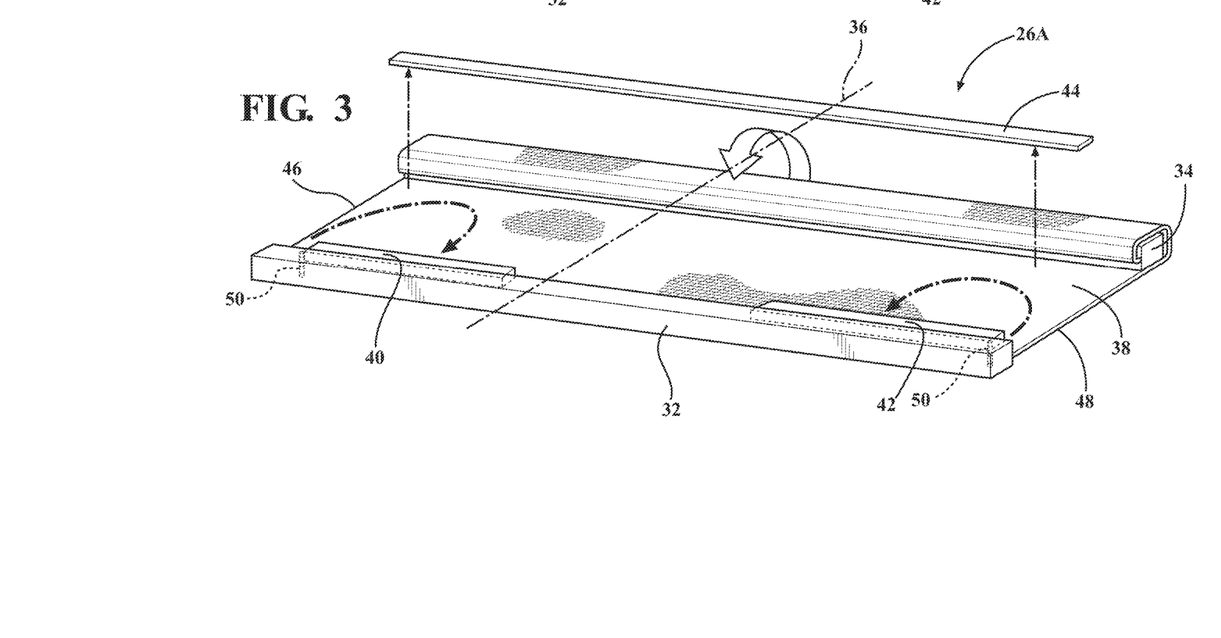
FIG. 3 is a schematic partially exploded perspective view of the first embodiment of the roof panel in a stowed configuration.

Referring to FIGS. 2 and 3, a first embodiment of the roof panel is generally shown at 26A. The panel 38 of the roof panel 26A may include and be manufactured from a flexible material suitable for roof of a vehicle 20, such as but not limited to a canvas material or a vinyl material. The roof panel 26A includes a first support 40 and a second support 42. The first support 40 and the second support 42 selectively connect the first member 32 and the second member 34 of the roof panel 26A. When the roof panel 26A is disposed in the deployed configuration, the first support 40 extends perpendicular to and interconnects the first member 32 and the second member 34 along a first edge 46 of the panel 38. When the roof panel 26A is disposed in the stowed configuration, the first support 40 is disposed parallel to the first member 32 and the second member 34. The first support 40 may include a first end that is attached to one of the first member 32 and the second member 34 with a hinge 50, and a second end that is attached to the other of the first member 32 and the second member 34 with a latch or other connection. The hinge 50 enables the first support 40 to fold up tight against the first member 32 or the second member 34 when in the stowed configuration. Similarly, when the roof panel 26A is disposed in the deployed configuration, the second support 42 extends perpendicular to and interconnects the first member 32 and the second member 34 along a second edge 48 of the panel 38. When the roof panel 26A is disposed in the stowed configuration, the second support 42 is disposed parallel to the first member 32 and the second member 34. The second support 42 may include a first end that is attached to one of the first member 32 and the second member 34 with a hinge 50, and a second end that is attached to the other of the first member 32 and the second member 34 with a latch or other connection. The hinge 50 enables the second support 42 to fold up tight against the first member 32 or the second member 34 when in the stowed configuration. It should be appreciated that the first support 40 and the second support 42 may be attached to the first member 32 and the second member 34 in some other manner not described herein.

The roof panel 26A may further include a spar 44. The spar 44 is attached to and interconnects the first support 40 and the second support 42 when the roof panel 26A is disposed in the deployed configuration, and is detached from the first support 40 and the second support 42 when the roof panel 26A is disposed in the stowed configuration. The spar 44 may be attached to one of the first member 32 or the second member 34, or rolled up on the flexible member, when the roof panel 26A is configured in the stowed configuration. When the roof panel 26A is configured in the deployed configuration, the spar 44 may be attached to the first support 40 and the second support 42 in any suitable manner, and provides a brace between the first support 40 and the second support 42.

FIG. 2 shows the roof panel 26A configured in the deployed configuration, whereas FIG. 3 shows the roof panel 26A configured in a partially stowed configuration. In order to reconfigure the roof panel 26A from the deployed configuration into the stowed configuration, the roof panel 26A is first removed from the vehicle 20 by disconnecting the first member 32 and the second member 34 from the first structural member 28 and the second structural member 30 of the body 22. The spar 44 is then detached from the first support 40 and the second support 42, and the first support 40 and the second support 42 are then disconnected and folded against one of the first member 32 or the second member 34. The panel 38 may then be rolled up into the stowed configuration, and the roof panel 26A stored in a suitable compartment of the vehicle 20. The process of reconfiguring the roof panel 26A from the stowed configuration into the deployed configuration is the reverse of the process described above.

Figure 4:
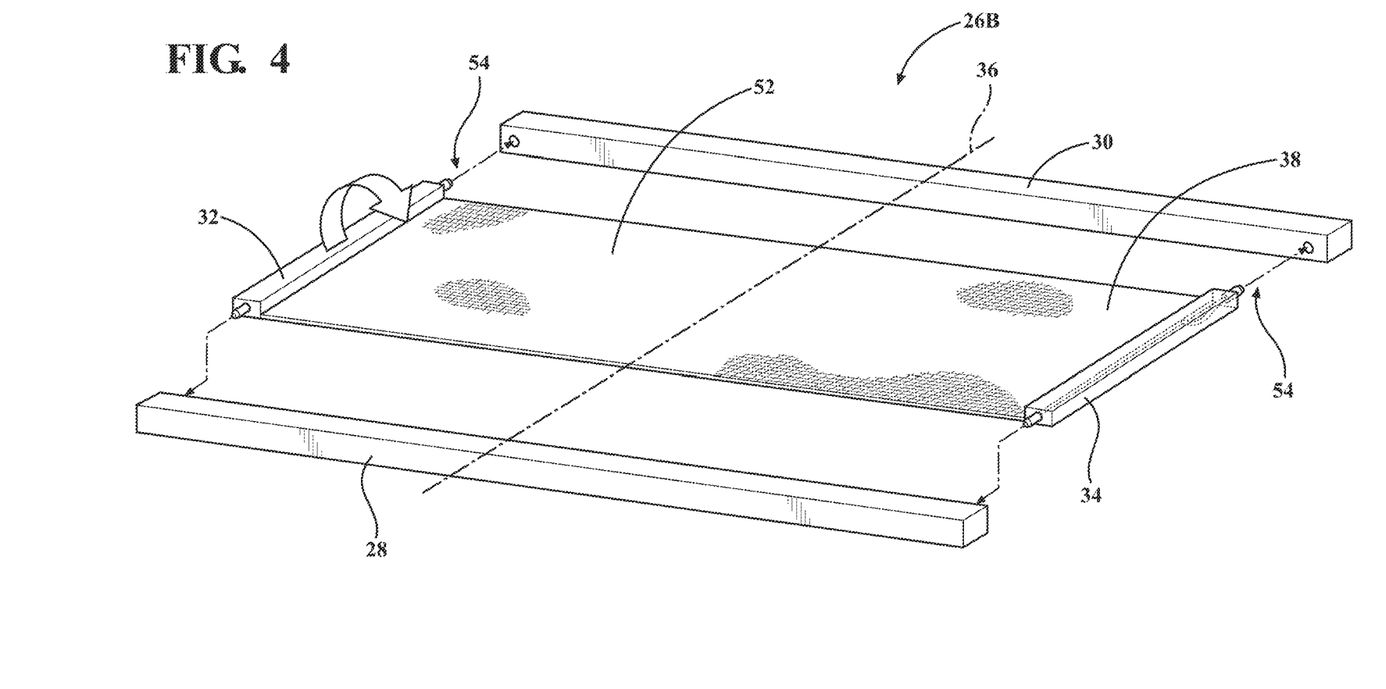
FIG. 4 is a schematic fragmentary partially exploded perspective view of the vehicle showing a second embodiment of the roof panel in the deployed configuration.
Figure 5:
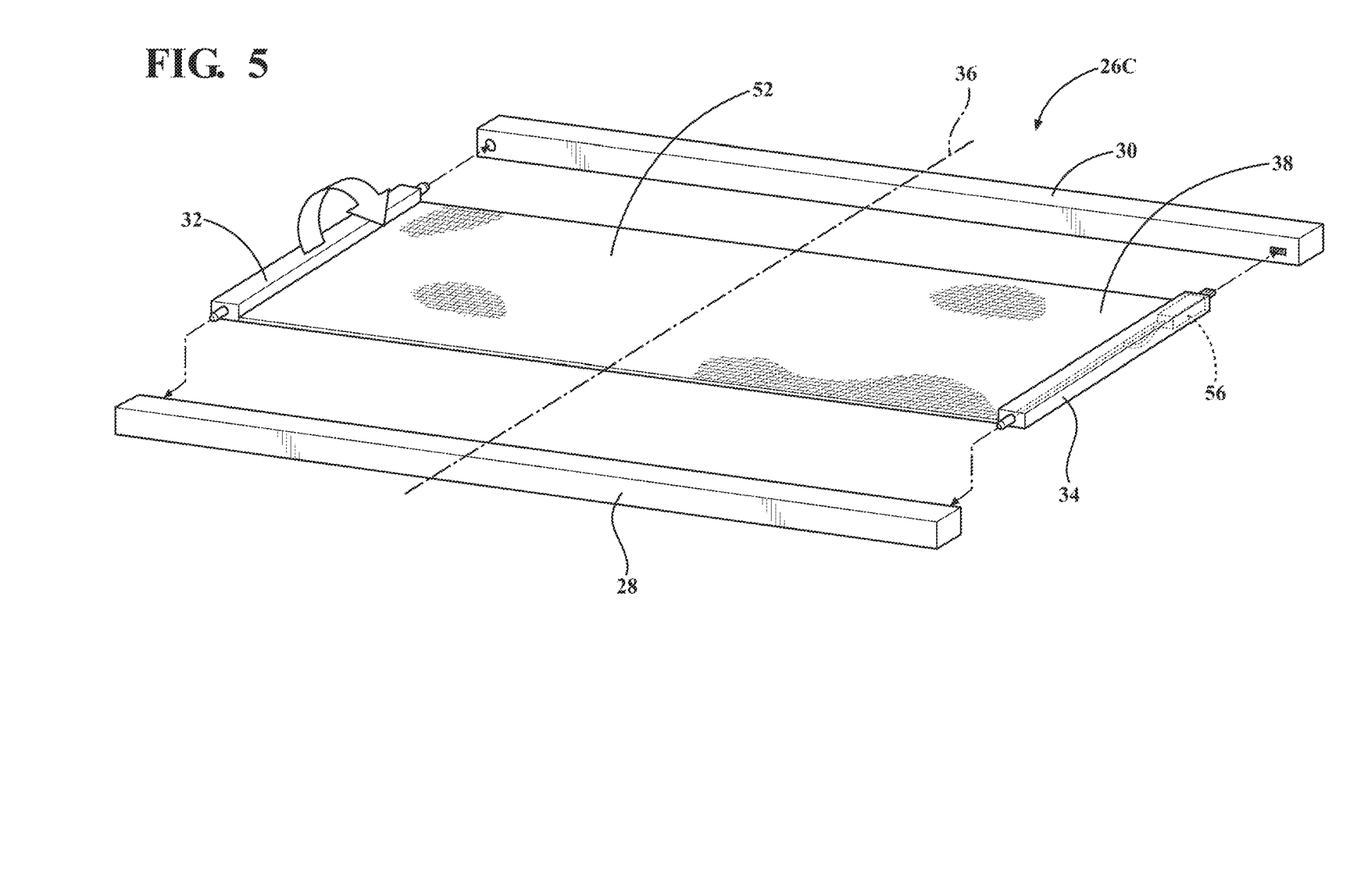
FIG. 5 is a schematic plan view of a third embodiment of the roof panel.
Figure 6:
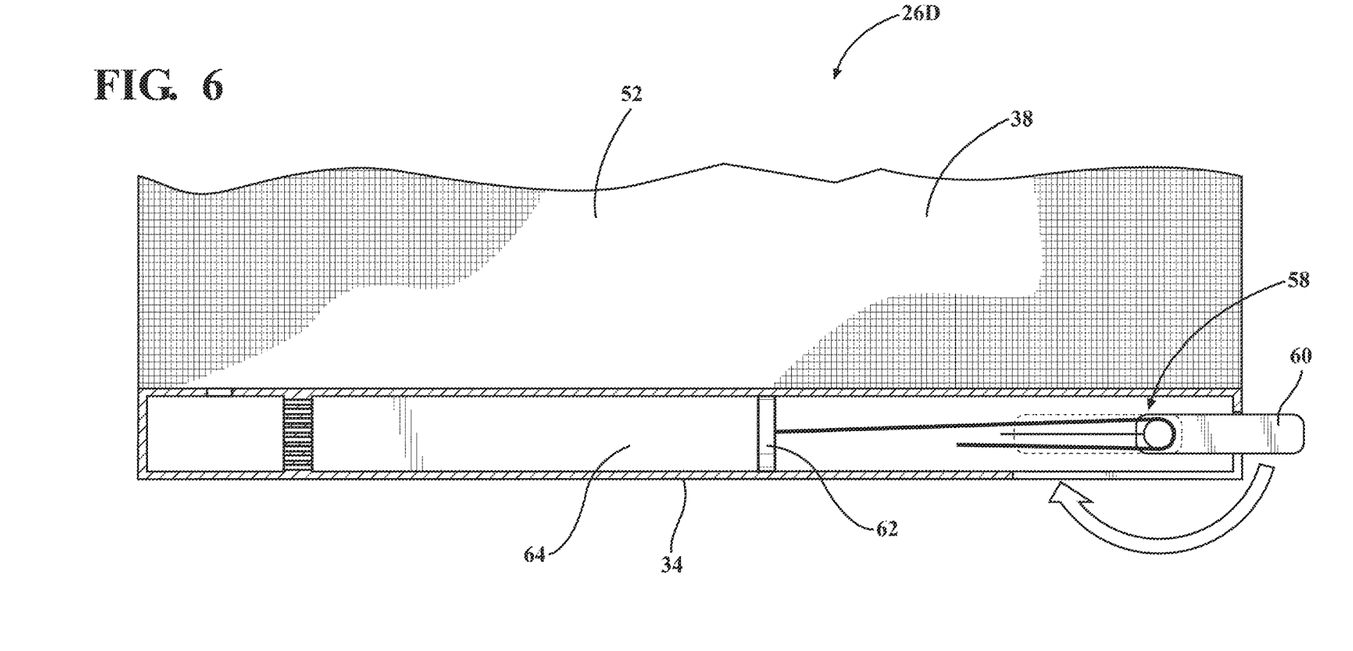
FIG. 6 is a schematic plan view of a fourth embodiment of the roof panel.

Referring to FIGS. 4-6, different embodiments of the roof panel 26B, 26C, 26D are shown, in which the panel 38 is an adjustable stiffness panel 52. The adjustable stiffness panel 52 is controllable in response to a control signal to exhibit at least one of a first stiffness or a second stiffness. As described herein, the first stiffness is a higher or greater stiffness than the second stiffness. Generally, the first stiffness exhibits a stiffness capable of providing and maintaining a specific form or shape of the adjustable stiffness panel 52, whereas the second stiffness exhibits a stiffness that enables the adjustable stiffness panel 52 to bend and flex in order to change the shape or form of the roof panel 26B, 26C, 26D.

The adjustable stiffness panel 52 may include, but is not limited to, one of a layer jamming panel, an inflatable panel, a mechanically locking panel, or electro-magnetic panel. The specific control signal for controlling the shape of the adjustable stiffness panel 52 is dependent upon the specific construction and type of the adjustable stiffness panel 52. For example, the control signal may include, but is not limited to, one of a negative air pressure (i.e., a vacuum), a positive air pressure, or an electric current.

In the exemplary embodiment of the adjustable stiffness panel 52 described herein, the adjustable stiffness panel 52 is described as a layer jamming panel. However, it should be appreciated that the adjustable stiffness panel 52 is not limited to the exemplary embodiment of the layer jamming panel. As is understood by those skilled in the art, layer jamming panels include an airtight envelope with multiple layers inside. Layer jamming panels use negative air pressure, i.e., a vacuum, to pack the thin layers of material in order to amplify the friction between each of the layers, and thereby increasing the relative shear stress experienced by the layers, which results in a higher structural system stiffness. The construction and operation of layer jamming panels are understood by those skilled in the art, and are therefore not described in detail herein. The control signal for the layer jamming panels is a negative air pressure or vacuum.

The roof panel 26B, 26C, 26D is controlled to exhibit the first stiffness when configured in the deployed configuration. As noted above, the first stiffness is a higher stiffness capable of maintaining the shape or form of the adjustable stiffness panel 52. The adjustable stiffness panel 52 is controlled to exhibit the second stiffness when re-configuring the adjustable stiffness panel 52 between the deployed configuration and the stowed configuration. As noted above, the second stiffness is a lower stiffness that enables the adjustable stiffness panel 52 to bend and flex, and thereby change its shape or form. The adjustable stiffness panel 52 may be controlled to exhibit the first stiffness when configured in the stowed configuration, in order to maintain the generally rolled form of the stowed configuration.

Referring to FIG. 4, a second embodiment of the roof panel is generally shown at 26B. The second embodiment of the roof panel 26B includes a control interface 54 connecting one of the first structural member 28 and the second structural member 30 with the adjustable stiffness panel 52 through one of the first member 32 or the second member 34. Accordingly, the control interface 54 interconnects one of the first structural member 28 and the second structural member 30 with one or both of the first member 32 and/or the second member 34 of the roof panel 26B. The control interface 54 is operable to communicate the control signal to the adjustable stiffness panel 52. For example, in the exemplary embodiment of the adjustable stiffness panel 52 described herein, in which the adjustable stiffness panel 52 is a layer jamming panel, the control interface 54 is operable to communicate a negative pressure to the adjustable stiffness panel 52. The control interface 54 may be connected to a vacuum source of the vehicle 20, and when activated, applies the negative air pressure to the adjustable stiffness panel 52. The control interface 54 may be controlled or activated by a system controller of the vehicle 20, and uses a system of the vehicle 20 to provide the control signal for controlling the stiffness of the adjustable stiffness panel 52. The control interface 54 may include, but is not limited to, a plug, port, plunger, etc.

FIG. 4 shows the roof panel 26B configured in the deployed configuration. In order to reconfigure the roof panel 26B from the deployed configuration into the stowed configuration, the system controller sends the control signal to the adjustable stiffness panel 52 via the control interface 54, to change the adjustable stiffness panel 52 from the first stiffness to the second stiffness, thereby decreasing the stiffness of the adjustable stiffness panel 52. The roof panel 26B is then removed from the body 22 of the vehicle 20 by disconnecting the first member 32 and the second member 34 of the roof panel 26B from the first structural member 28 and the second structural member 30 of the body 22. The roof panel 26B may then be rolled up into the stowed configuration. Optionally, the adjustable stiffness panel 52 may be controlled to exhibit the first stiffness, in order to maintain the rolled form of the stowed configuration. The roof panel 26B may then be stored in a suitable compartment of the vehicle 20. The process of reconfiguring the roof panel 26B from the stowed configuration into the deployed configuration is the reverse of the process described above. It should be appreciated that the roof panel 26B may include a mechanism to securely attach and seal the roof panel 26B to the first structural member 28 and the second structural member 30. Such mechanisms are understood by those skilled in the art, are not pertinent to the teachings of this disclosure, and are therefore not described in detail herein.

Referring to FIG. 5, a third embodiment of the roof panel is generally shown at 26C. The third embodiment of the roof panel 26C includes an actuator 56 incorporated into and integral with one or both of the first member 32 and the second member 34. The actuator 56 is operable to generate the control signal, which may applied to the adjustable stiffness panel 52 to control the stiffness of the adjustable stiffness panel 52. The actuator 56 may be activated in a suitable manner, such as but not limited to a control system of the vehicle 20, or by a switch activated by an operator. The actuator 56 may include, but is not limited to, a negative air pressure pump (i.e., a vacuum pump), a positive air pressure pump, a linear actuator 56, etc. In the exemplary embodiment described herein, in which the adjustable stiffness panel 52 is a layer jamming panel, the actuator 56 is embodied as a negative air pressure pump. Because the actuator 56 is built into the roof panel 26C, the roof panel 26C is not dependent upon a vehicle 20 system to provide the control signal, and may be controlled independent of the vehicle 20. In other embodiments, the actuator 56 may be separate from the roof panel 26C and the vehicle 20, and may be connected to the actuator 56 of the roof panel 26C when desired.

FIG. 5 shows the roof panel 26C configured in the deployed configuration. In order to reconfigure the roof panel 26C from the deployed configuration into the stowed configuration, the actuator 56 is activated to provide the control signal to the adjustable stiffness panel 52 via, to change the adjustable stiffness panel 52 from the first stiffness to the second stiffness, thereby decreasing the stiffness of the adjustable stiffness panel 52. The roof panel 26C is then removed from the body 22 of the vehicle 20 by disconnecting the first member 32 and the second member 34 of the roof panel 26C from the first structural member 28 and the second structural member 30 of the body 22. The roof panel 26C may then be rolled up into the stowed configuration. Optionally, the actuator 56 may be activated to control adjustable stiffness panel 52 to exhibit the first stiffness, in order to maintain the rolled form of the stowed configuration. The roof panel 26C may then be stored in a suitable compartment of the vehicle 20. The process of reconfiguring the roof panel 26C from the stowed configuration into the deployed configuration is the reverse of the process described above.

Referring to FIG. 6, a fourth embodiment of the roof panel is generally shown at 26D. The fourth embodiment of the roof panel 26D includes an actuator 56 incorporated into and integral with one or both of the first member 32 and the second member 34. The actuator 56 is operable to generate the control signal, which may applied to the adjustable stiffness panel 52 to control the stiffness of the adjustable stiffness panel 52. The actuator 56 includes a mechanical actuator 56, which is operable to generate the control signal. The mechanical actuator 56 may be integrated into and/or part of the latching system used to connect the first member 32 and/or the second member 34 to the first structural member 28 and the second structural member 30. For example, the mechanical actuator 56 may include a manually actuated pump 58 operable to generate a negative air pressure or a positive air pressure in the adjustable stiffness panel 52. The manually actuated pump 58 may include, for example, a lever 60 connected to a piston 62, which is disposed within a chamber 64. Rotation of the lever 60 moves the piston 62 within the chamber 64 to generate the negative air pressure control signal. The lever 60 may additionally be connected to the latch system that connects the roof panel 26D to the body 22 of the vehicle 20. As such, actuation of the lever 60 attaches or detaches the roof panel 26D from the body 22, and also generates or releases the control signal to control the stiffness of the adjustable stiffness panel 52.

FIG. 6 shows the roof panel 26D configured in the deployed configuration. In order to reconfigure the roof panel 26D from the deployed configuration into the stowed configuration, the lever 60 is moved to control the adjustable stiffness panel 52 to change the adjustable stiffness panel 52 from the first stiffness to the second stiffness, thereby decreasing the stiffness of the adjustable stiffness panel 52. Movement of the lever 60 may also detach the roof panel 26D from the body 22 of the vehicle 20. The roof panel 26D may then be removed from the vehicle 20, and rolled up into the stowed configuration. Optionally, the lever 60 may be moved to control adjustable stiffness panel 52 to exhibit the first stiffness, in order to maintain the rolled form of the stowed configuration. The roof panel 26D may then be stored in a suitable compartment of the vehicle 20. The process of reconfiguring the roof panel 26D from the stowed configuration into the deployed configuration is the reverse of the process described above.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A vehicle comprising:
a body having a first structural member and a second structural member; and
a roof panel removably attached to the body, the roof panel including:
a first member releasably secured to the first structural member;
a second member releasably secured to the second structural member;
a panel attached to and interconnecting the first member and the second member;
wherein the panel is a layer jamming panel adjustable between a first stiffness and a second stiffness in response to a vacuum control signal; and
wherein the roof panel is configurable between a deployed configuration for attachment to the body, and a stowed configuration for storage, with the roof panel having a generally planar form when configured in the deployed configuration.

2. The vehicle set forth in claim 1, wherein one of the first structural member and the second structural member include a control interface operable to communicate the vacuum control signal to the panel.

3. The vehicle set forth in claim 1, wherein one of the first member and the second member include an actuator operable to generate the vacuum control signal.

4. The vehicle set forth in claim 3, wherein the actuator includes a negative air pressure pump.

5. A vehicle comprising:
a body defining a passenger compartment having a forward roof member and a rearward roof member; and
a roof panel removably attached to the body to enclose the passenger compartment, the roof panel including:
a first member releasably secured to the forward roof member;
a second member releasably secured to the rearward roof member;
an adjustable stiffness panel attached to and interconnecting the first member and the second member, and controllable in response to a control signal to exhibit one of a first stiffness or a second stiffness;

wherein one of the first member and the second member include an actuator operable to generate the control signal; and wherein the roof panel is configurable between a deployed configuration for attachment to the body, and a stowed configuration for storage, with the roof panel having a generally planar form exhibiting the first stiffness when configured in the deployed configuration.

6. The vehicle set forth in claim 5, wherein the adjustable stiffness panel includes a layer jamming panel.

7. The vehicle set forth in claim 5, wherein the actuator includes a negative air pressure pump.

8. The vehicle set forth in claim 5, wherein the adjustable stiffness panel is controlled to exhibit the second stiffness when re-configuring the adjustable stiffness panel between the deployed configuration and the stowed configuration, and is controlled to exhibit the first stiffness when configured in the stowed configuration.

9. A roof panel for a vehicle, the roof panel comprising:
a first member configured for releasable attachment to a forward roof member of the vehicle;

a second member configured for releasable attachment to a rearward roof member of the vehicle; and an adjustable stiffness panel attached to and interconnecting the first member and the second member, wherein the adjustable stiffness panel includes a layer jamming panel controllable in response to a vacuum control signal to exhibit one of a first stiffness or a second stiffness;

wherein the adjustable stiffness panel is configurable between a deployed configuration and a stowed configuration, with the adjustable stiffness panel having a generally planar form exhibiting the first stiffness when configured in the deployed configuration; and wherein the adjustable stiffness panel is controlled to exhibit the second stiffness when re-configuring the adjustable stiffness panel between the deployed configuration and the stowed configuration, and is controlled to exhibit the first stiffness when configured in the stowed configuration.

* * * * *